May 13, 1924.
F. NAGLER
1,494,008
METHOD OF AND MEANS FOR CONVERTING ENERGY
Filed Sept. 5, 1918   2 Sheets-Sheet 1
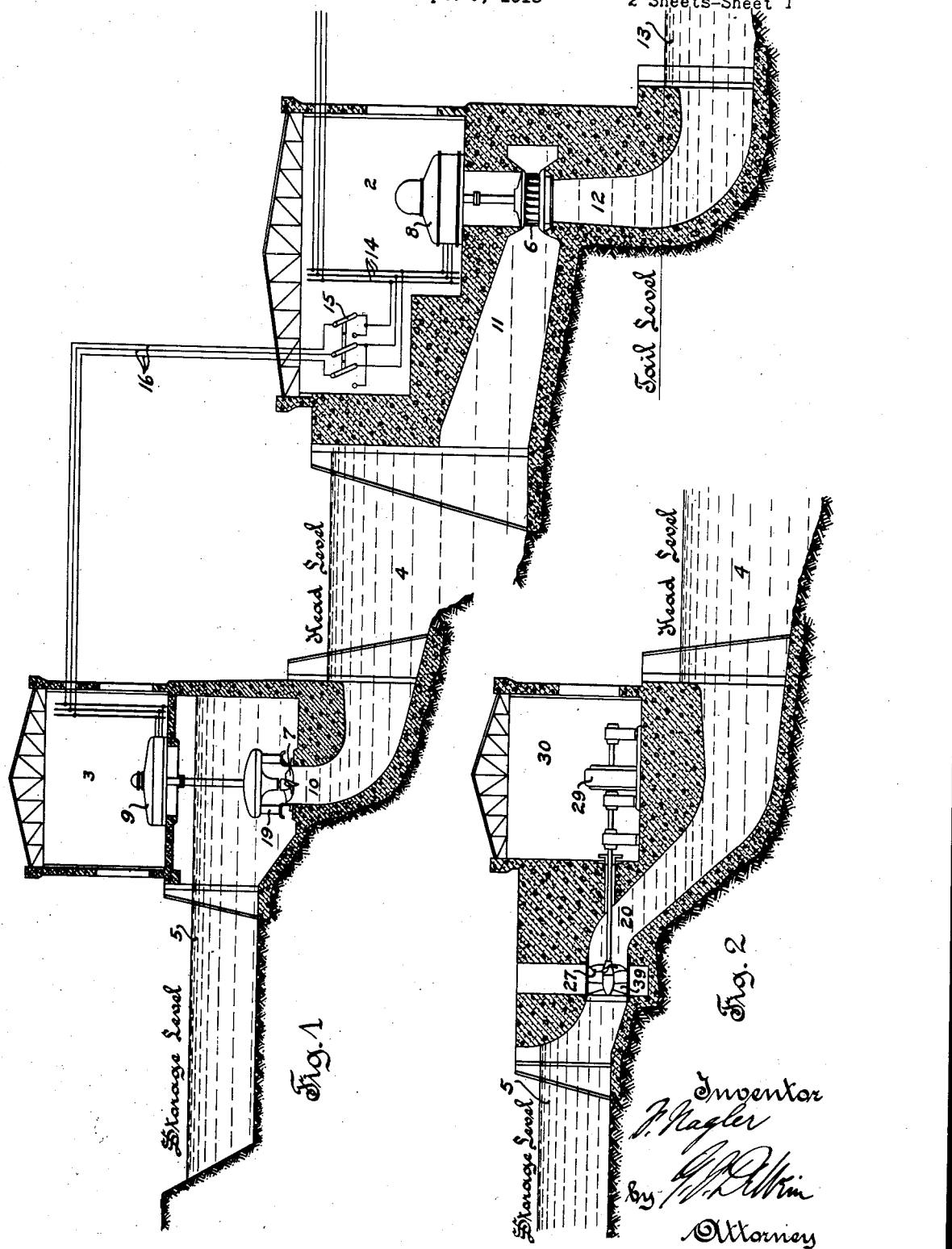

Patented May 13, 1924.

1,494,008

UNITED STATES PATENT OFFICE.

FORREST NAGLER, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

METHOD OF AND MEANS FOR CONVERTING ENERGY.

Application filed September 5, 1918. Serial No. 253,112.

*To all whom it may concern:*

Be it known that FORREST NAGLER, a citizen of the United States, residing at Wauwatosa, in the county of Milwaukee and State of Wisconsin, has invented a certain new and useful Improvement in Methods of and Means for Converting Energy, of which the following is a specification.

This invention relates to an improved method of and apparatus for converting energy of fluids such as water.

An object of the invention is to provide a simple and efficient method of converting energy of water. Another object of the invention is to provide simple and efficient apparatus for exploiting this method.

There are in existence numerous undeveloped and developed hydraulic power sites in which the source of power comprises a stream of water having substantially constant available head and a fixed rate of flow, and in which there is little or no excess forebay capacity available for storage purposes. In developed sites of this kind in which there is a demand to furnish variable quantities of power for commercial purposes, the available head and rate of flow are ordinarily capable of producing power in excess of the demand during periods of low load, but are insufficient to supply the power demanded during periods of peak load. In completed installations of relatively small capacity having sites of this nature, it is common practice to utilize storage batteries for the purpose of storing excess energy during periods of low load, and to utilize the stored energy to supply the excess demand, during periods of peak load. In larger installations of this kind it is however impracticable to utilize storage batteries and in some of these larger installations storage reservoirs have been provided into which an excess supply of water is forced during periods of low load, the stored water being utilized to operate one or more prime movers in order to furnish the excess power demanded during periods of peak load. In such prior large installations it has been the universal practice to provide pumping means for forcing the water into the storage reservoir and to either provide one or more auxiliary turbines for utilizing the storage water to produce power, or to utilize this stored water directly in the main turbines of the installation during the peak load periods. In cases where auxiliary turbines are provided, it is necessary to additionally provide pumping means for storing the excess water. In cases where the main units are utilized in order to abstract the energy from the storage water, the main units must be constructed of sufficient capacity to be able to furnish the maximum power demand during the periods of peak loads, and pumping means must be provided in addition to this enlargement of the main units, to elevate water into the storage reservoirs.

The present invention contemplates provision of a method of and means for converting energy of water available in such a site, by elevating the excess water with the aid of pumping means during periods of low load, and subsequently utilizing the same pumping means to convert potential energy of the stored water into kinetic energy during periods of peak load. This interchangeably operable pump-turbine is of exceedingly simple construction and highly efficient in operation regardless of its mode of operation, and produces an installation of maximum capacity and efficiency at minimum cost of construction and operation.

A clear conception of the various steps of the novel method and of several forms of apparatus adapted to exploit the same, may be had by referring to the drawings accompanying and forming a part of this specification in which like reference characters designate the same or similar parts in the various views.

Fig. 1 is a diagrammatic vertical section through a hydraulic power installation, the section through the storage reservoir and auxiliary power house being taken at right angles to the section through the main power house and tailrace.

Fig. 2 is a diagrammatic vertical section through another form of auxiliary power house.

Figure 3:
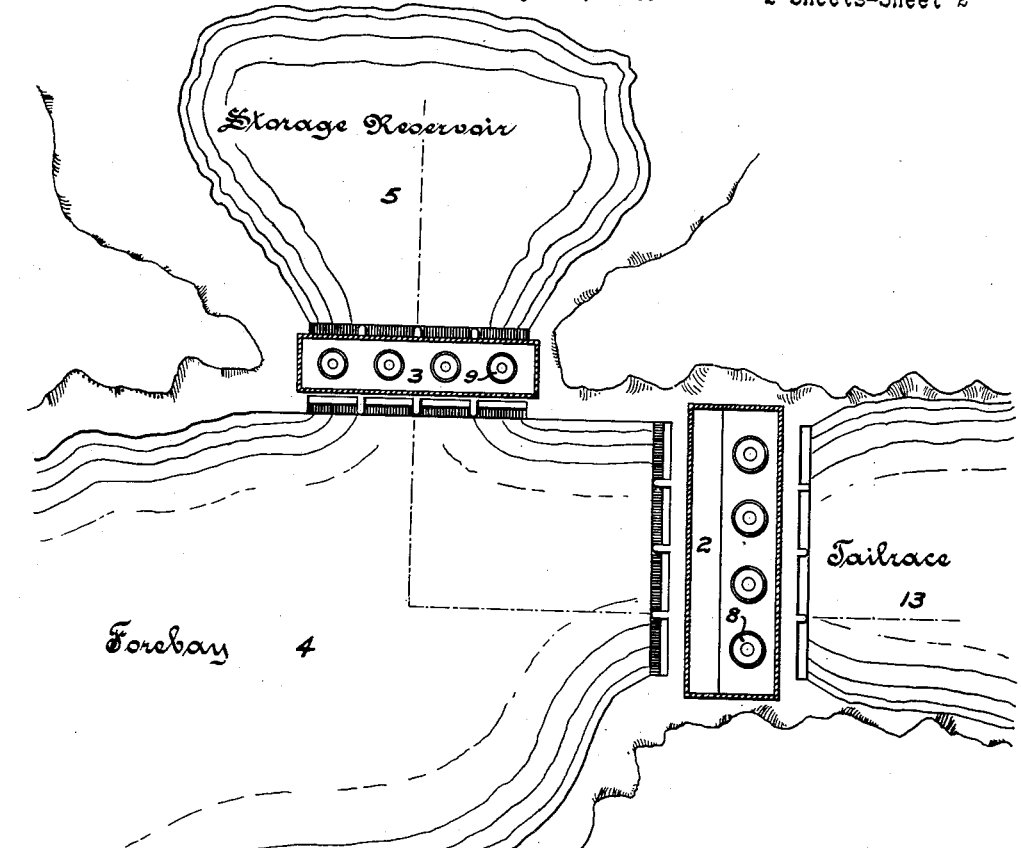
Fig. 3 is a diagrammatic, part sectional plan view of the power site showing the forebay, tailrace, storage reservoir and the power houses.

The power installation illustrated in the drawing comprises in general a source of water supply communicating with a forebay 4 of limited pondage capacity, a tailrace 13 located below the forebay level, a storage reservoir 5 located above the forebay level, a main power house or station 2, and an auxiliary power house or station 3, 30. The main power station 2 comprises one or more vertically arranged Francis or other type of turbines 6, each of which communicates with the forebay 4 through an inlet flume 11 and with the tailrace 13 through a draft tube 12. The rotors of the turbines 6 are preferably direct connected by means of vertical shafts to the rotors of dynamo-electric machines 8. These direct connected turbo-generator sets convert the hydraulic energy into electrical energy which is delivered to the bus-bar 14 connected with a commercial distribution system. The turbo-generator sets are operable in parallel and as ordinarily constructed are independently controllable by means of suitable governing mechanism.

Figure 5:
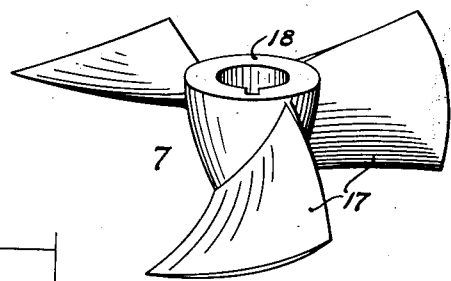
Fig. 5 is a perspective view of the convertible pump-turbine rotor.

The auxiliary power house or station 3 disclosed in Fig. 1, comprises one or more vertically arranged convertible pump-turbines 7, each of which communicates with the storage reservoir 5 through an open inlet flume and an adjustable gate mechanism 19 and with the forebay 4 through a conduit 10. The rotor of each of these pump-turbines 7 comprises a series of substantially radial vanes 17 rigidly associated with a central hub 18 which is connected to a vertical shaft, see Fig. 5. The pump-turbine rotors of this specific embodiment are direct connected by the vertical shafts, to the rotors of convertible dynamo-electric machines 9. The pump-turbines 7 are so constructed that they will operate with practically the same high efficiency, either as screw pumps for elevating water or as turbines for translating hydraulic energy, depending upon the direction of rotation and of delivery of fluid therethrough. The dynamo-electric machines 9 are so constructed that they will operate with practically the same high efficiency, either as motors for operating the pump-turbines 7 as pumps or as dynamos for translating the energy of the pump-turbines 7 when operating as turbines into electrical energy, depending upon the direction of rotation. The dynamo-electric machines 9 are connected with the bus-bars 14 by means of wiring 16 and a reversing switch 15.

The auxiliary power house or station 30 disclosed in Fig. 2, comprises one or more horizontally arranged convertible pump-turbines 27, each of which communicates with the storage reservoir 5 through an open inlet flume and an adjustable gate mechanism 39 and with the forebay 4 through a conduit 20. The rotors of these pump-turbines 27 are similar in construction to the rotors disclosed in Fig. 5. The pump-turbine rotors of this specific embodiment are direct connected by means of horizontal shafts, to the convertible dynamo-electric machines 29 associated with the bus-bars 14 as in the arrangement disclosed in Fig. 1.

The details of construction of the pump-turbine rotors 7, 27 form no part of the present invention, the same being covered by application for Letters Patent Serial No. 197,964, filed Oct. 20, 1917. The details of construction of the turbine gate and governing mechanisms have also been omitted from the present disclosure as these are well known to those skilled in the art. While both the main and auxiliary power houses have been disclosed as comprising four units each, it will be understood that the number of these units as well as the capacity thereof vary greatly with variations in the nature of the power sites.

The power demand in ordinary commercial hydro-electric installations varies greatly at different periods of the day. The primary peak load or period of maximum power demand is ordinarily at about six o'clock in the afternoon, while the secondary peak load or period of second greatest power demand, is at approximately seven o'clock in the morning. The period of minimum power demand is ordinarily at about three o'clock at night while the secondary minimum is reached at approximately twelve-thirty noon.

During normal operation of the installation disclosed in Figs. 1 and 3, and assuming the time of the day to be a period of low load, such as three o'clock at night or twelve-thirty noon, there is, at such time, an excess of water available from the stream or forebay 4, over that required to supply the commercial power demand. The main turbines 6 are receiving water from the forebay 4 and are converting the energy of this water through the intermediary of the electric generators 8, delivering this converted energy as electric current to the bus-bars 14 from which the commercial line is supplied. The water after leaving the turbines 6 is delivered through the draft tubes 12 to the tailrace 13. The electrical energy delivered to the bus-bars 14 is somewhat in excess of that demanded by the commercial system, and this excess energy is being utilized in the convertible dynamo-electric machines 9 to operate the pump-turbines 7, as pumps. The operation of the convertible dynamo-electric machines 9 as motors is effected by properly setting the reversing switches 15. While the pump-turbines 7 are being operated as pumps, they withdraw excess water which cannot be utilized by the main turbines 6, from the forebay 4 through the conduits 10, and deliver this water into the storage reservoir 5. As the energy demand in the commercial system increases, the amount of water available from the stream or forebay 4 for operation of the main turbines 6, gradually becomes insufficient to permit these main turbines to supply the demanded energy. When the point is reached where these main turbines 6 can no longer supply the demanded energy with the available fixed supply, the switches 15 are reversed thereby permitting reversal of the direction of rotation of the pump-turbines 7. This reversal of the switches 15 may be either manual or automatic in response to load changes. Upon reversal of the switches 15, the previously stored water from the reservoir 5 flows back through the auxiliary units or pump-turbines 7 causing these units to operate as turbines, and delivers its energy to the convertible dynamo-electric machines 9, which operating as generators, deliver the converted energy to the bus-bars 14. The water leaving the pump-turbines 7 passes through the conduits 10 and into the forebay 4. The delivery of this water from the storage reservoir 5 into the forebay 4 increases the available water supply for the main turbines 6, thereby permitting increased output by these turbines 6 over that normally resulting from the available normal or fixed flow in the stream. In this manner, it will be noted, that the energy conversion resulting from the combined operation of the auxiliary power house units and the main units may be made a maximum thereby permitting production of maximum power for commercial purposes, during periods of peak load.

The operation of the installation embodying an auxiliary power installation such as shown in Fig. 2 is substantially analogous to that of the installation shown in Fig. 1. The only difference between these two installations is the arrangement of the hydraulic energy converters in the auxiliary power plants.

Figure 4:
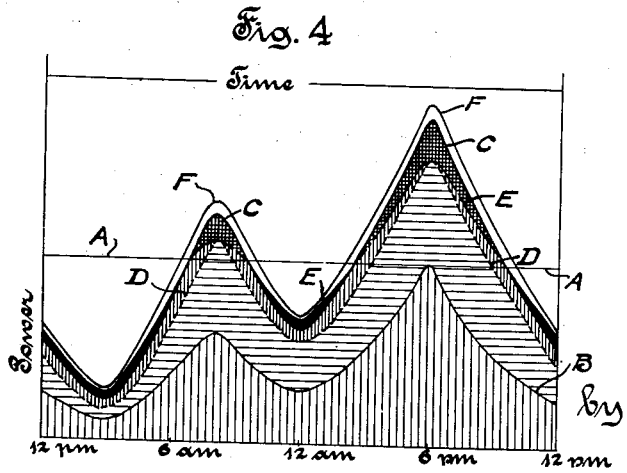
Fig. 4 is a time-power diagram showing the results attainable with the present invention as compared to the results attainable with the prior construction.

The effect of utilizing the present invention will be more readily apparent from an investigation of the diagram disclosed in Fig. 4. In considering this diagram, it should be remembered that the present invention is primarily applicable to installations having practically no forebay capacity or pondage and associated with a stream in which the fixed flow during periods of low load is excessive and during periods of peak load is insufficient to supply the demanded energy. The horizontal line A represents the total available energy in the stream, based on the fixed rate of flow and the normal head. If the power demand were constant, the turbines being of proper capacity, the installation could furnish the energy represented by the area below this horizontal line A for the full twenty-four hour period. The curve B represents a typical commercial load curve for a twenty-four hour period. In the entire absence of storage means for accumulating excess energy during the periods of low load, an ordinary commercial installation having an energy source such as represented by the horizontal line A could furnish only the energy represented by the area below the curve B, it being impossible at any time, to supply power beyond the horizontal line A which under the conditions stated, represents the peak load limit. If the installation is located at an ideal site and is provided with maximum storage pondage sufficient to store all of the excess water during periods of low load, the turbines being constructed of sufficient capacity to utilize all of this stored water during periods of peak load, the energy converted during a twenty-four hour period is represented by the area below the curve F, which area neglecting the turbine and generator efficiencies, should be substantially equal to the area below the horizontal line A. The area between the curve F and the curve B represents the power which is gained by the provision of perfect storage facilities. As the installation herein disclosed and in which the invention is primarily applicable, is of the type having little or no available storage pondage associated directly with the stream, the ideal result attainable with unlimited storage capacity, can only be approached but not equalled. The convertible pump-turbines however permit such approach of ideal conditions and effect maximum conversion of the available energy at exceedingly low cost of installation and maintenance. The curve C represents the power which is made available through the use of the convertible pump-turbines 7 and auxiliary storage reservoir 5 located above the head level or forebay 4. The area below the curve D represents the energy available in an installation of the type hereinabove mentioned, in which there is insufficient forebay capacity and in which excess water is stored in an auxiliary reservoir located above the forebay level during periods of low load, by means of special non-convertible pumping apparatus, this excess water being utilized only in the main turbines to produce power during periods of peak load. The vertical distance between the curves D and F represents the loss in power due to inefficiency of the pumping apparatus and to the return of water from the storage reservoir to the level of the forebay 4 without developing power. The curve E is not strictly a load curve but merely co-operates with the curve C to define the areas representing the energy absorbed and delivered by the pump-turbines 7 when operating as pumps and as turbines respectively. The black areas below the line A and directly between the curves C and E represent excess energy converted by the main units during periods of low load and absorbed by the pump-turbines 7 when operating as pumps. This energy is supplied from the main electrical line and its utilization during periods of low loads, while representing a loss of energy, does not affect the commercial power output. The areas above the line A and directly between the curves C and E represent the energy made available for commercial purposes by the pump-turbines 7 when operating as turbines. The area between the curves C and D represents the total power gained by utilizing the present invention, over that available in the prior art systems utilizing pumps and storage reservoirs only. It will thus be noted that the energy available with the present invention, during peak load periods and represented by the highest point of the curve C, very nearly approaches the peak of the curve F and is considerably greater than in curve D. By raising the peaks of the load curve, the entire curve will be raised in proportion thereby increasing to a maximum the total energy available during the entire twenty-four hour period.

As the efficiency of the pump-turbines 7 when operating either as pumps or as turbines, is comparatively high, the energy losses are reduced to a minimum. These convertible pump-turbines 7 are moreover of exceedingly simple construction and will operate efficiently with practically no care or attention after initial installation. By utilizing the pump-turbines 7 to elevate the water and to convert the energy of the water when returning to the forebay 4, the necessity of providing separate devices for performing these two functions, is eliminated thereby considerably reducing the cost of installation and maintenance of the apparatus.

It should be understood that it is not desired to limit the invention to the exact steps of the process or construction of the apparatus herein shown and described for obvious modifications within the scope of the appended claims may occur to persons skilled in the art.

It is claimed and desired to secure by Letters Patent:

1. In combination, a hydro-electric unit comprising a rotary hydraulic machine direct connected to a rotary electrical machine, means for effecting operation of said unit as a motor driven pump rotating in one direction, and means for interchangeably effecting operation of said unit as a turbine driven generator rotating in the opposite direction.

2. In combination, a hydro-electric unit comprising a rotary hydraulic machine direct connected to a rotary electrical machine, and means for effecting interchangeable reversal and operation of said machines as prime movers for said unit.

3. In combination with a source of hydraulic energy, a main energy translating unit adapted to convert a portion of the hydraulic energy of said source into electrical energy in a distribution system, a pump turbine unit associated with said source, and a motor dynamo direct connected to said pump turbine unit and adapted to interchangeably receive electrical energy from and supply electrical energy to said distribution system.

4. In combination with three bodies of water located at different elevations, a main turbine communicating with the intermediate and with the lowest of said bodies, a pump turbine unit communicating with the highest and the intermediate of said bodies, and a distribution system receiving energy from said main turbine and interchangeably delivering energy to and receiving energy from said pump turbine unit.

5. In combination, a rotary hydraulic machine, a rotary interchangeably operable electrical machine direct connected to said hydraulic machine, a source of electrical energy supply cooperating to interchangeably receive energy from and to deliver energy to said electrical machine, said electrical machine being reversely rotatable during such interchangeable cooperation, and means for effecting such interchangeable cooperation of said electrical machine with said energy source.

In testimony whereof, the signature of the inventor is affixed hereto.

FORREST NAGLER.